Dec. 27, 1955  R. R. DAHL  2,728,355
BY-PASS FLOW WASHER
Filed Oct. 30, 1953
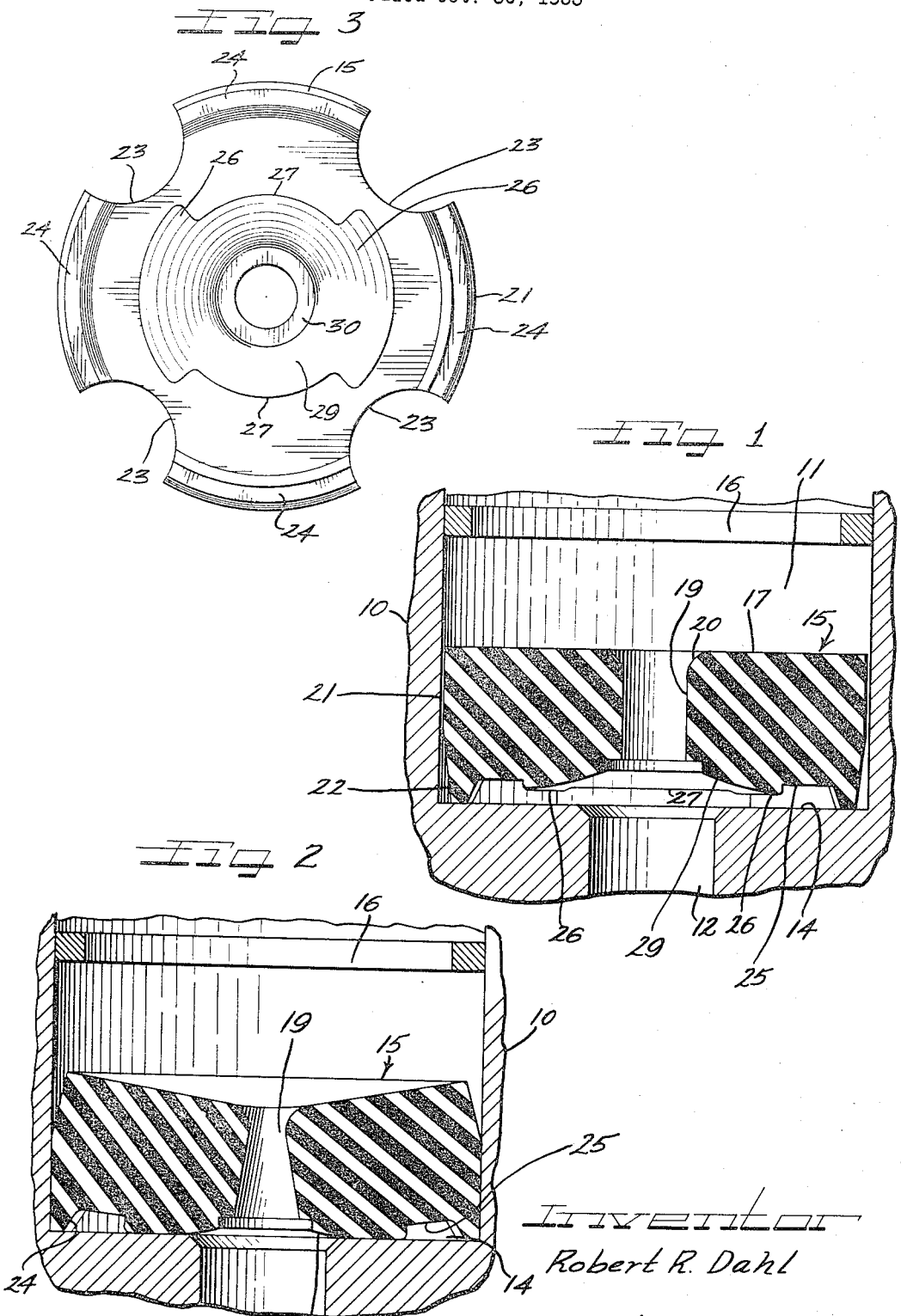
Inventor
Robert R. Dahl

United States Patent Office 2,728,355
Patented Dec. 27, 1955

2,728,355

BY-PASS FLOW WASHER

Robert R. Dahl, Chicago, Ill., assignor to The Dole Valve Company, Chicago, Ill., a corporation of Illinois Application October 30, 1953, Serial No. 389,209

7 Claims. (Cl. 138—45)

This invention relates to improvements in flow control devices for maintaining a substantially constant rate of fluid flow over a wide range of pressure variations and more particularly relates to such a flow control device in which fluid at low pressures is by-passed around the flow control element and passes through the central flow control orifice of the element at high pressures.

A principal object of my invention is to provide a new and improved form of annular flow control member arranged to by-pass fluid around the flow control member at low pressures and to close the by-pass passageways and pass fluid through the central orifice of the flow control member at high pressures.

Another object of my invention is to reduce the threshold pressure of flow control washers at low pressures by providing by-pass passageways along the sides of the flow control member and contouring the downstream face of the flow control member to form a valve seating against a shoulder of the passageway in the flow control member, to close the by-pass passageways upon predetermined increases in pressure on the upstream face of the flow control member.

A further object of my invention is to provide a novel and improved form of a resilient flow control member in which the control of the flow of fluid is obtained by flexing of the flow control member against a shoulder in a fluid passageway by the pressure acting on the upstream side thereof, and in which the downstream face of the flow control member is recessed in spaced relation with respect to the shoulder, and a plurality of by-pass passageways are provided in the periphery of the flow control member and opening into the recess on the downstream face thereof, to accommodate the by-pass of fluid past the central orifice of the flow control member at low pressures, and to accommodate the flow control member to move into engagement with the shoulder and block the by-pass of fluid along the sides of the flow control member at high pressures, and then control the flow of fluid by the flexing of the main body of the flow control member inwardly toward its center and outwardly along the shoulder, to reduce the cross-sectional area of said orifice as the pressure thereon increases.

A further object of my invention is to provide a novel and improved form of flow control device in which a resilient annular flow control member is seated against a shoulder in a passageway and is so arranged as to by-pass fluid past the periphery of the flow control member at low pressures and to block the passage of fluid along the periphery of said flow control member at higher pressures, and control the flow solely by flexing of the flow control member into engagement with the shouldered seat thereof.

A still further object of my invention is to provide a more efficient and simpler form of flow control member having by-pass passageways along the periphery thereof to pass fluid at low pressures along the sides thereof, and contoured on the downstream face thereof to be free from the seat of the flow control member and accommodate fluid to pass thereby through said by-pass passageways at low pressures and to block the passage of fluid thereby at higher pressures and restrict the cross-sectional area of the central portion thereof to effect a constant delivery rate through said flow control member for a wide range of pressure variations without deformation of the flow control member beyond either face thereof.

This application is a companion application to my application Serial No. 389,210, filed herewith and entitled "Flow Control Structure."

These and other objects of my invention will appear from time to time as the following specification proceeds and with reference to the accompanying drawings wherein:

Figure 1 is a fragmentary cross-sectional view taken through a fluid flow passageway, showing a flow control member constructed in accordance with my invention in a passageway in a relaxed position, with no fluid pressure on the flow control member;

Figure 2 is a view somewhat similar to Figure 1, but showing the flow control member in a flexed condition, effected by the pressure of fluid acting on the upstream face and sides thereof; and Figure 3 is a bottom plan view of the flow control member shown in Figure 1.

In the embodiment of my invention illustrated in the drawing, I have shown a portion of the casing 10, which may be a valve body, a conduit or the like. The casing 10 is shown as having an enlarged diameter passageway 11 leading therethrough for a portion of the length thereof, and terminating into a reduced diameter axially aligned passageway 12 which may be connected with a valve or a fluid delivery pipe or conduit or the like.

At the junction of the enlarged diameter passageway 11 with the reduced diameter passageway 12 is a shoulder 14 extending at right angles to the walls of said passageway and having a relatively large cross-sectional area compared with the cross-sectional area of the outlet passageway 12. The shoulder 14 is shown as forming a seat for a resilient annular flow control member 15. Spaced from the upstream side of the flow control member 15 is a retaining ring 16, which may be a snap ring and may be snapped into position in the inlet passageway 11, to retain the flow control member to the seat 14. The retaining ring 16 is shown as being spaced from the seat or shoulder 14 a distance sufficient to accommodate a limited freedom of movement of said flow control member between said seat and retaining ring.

The annular flow control member 15 may be made from a resilient or elastic material, such as rubber or one of the well known substitutes for rubber, such as "neoprene," and the like, so as to readily be flexible in a downstream direction into engagement with the shoulder 14 upon increases in the pressure of fluid acting thereon through the inlet passageway 11.

The flow control member 15 is shown as having a relatively flat face 17 on its upstream side when in a relaxed condition and as having a central opening or orifice 19 leading therethrough, axially aligned with the outlet 12 and of a smaller cross-sectional area than the cross-sectional area of the outlet 12.

The flow control member 15 is also shown as having a uniformly contoured or rounded shoulder 20 leading from the upstream face 17 to the orifice 19, to provide a uniform relatively smooth orifice for all degrees of flexure of said flow control member. The flow control member 15 also has an outer wall 21 fitting within the passageway 11 and having an inwardly tapered lower end portion 22, tapering inwardly to provide a space between the wall of the passageway 11 into which the flow control member 15 may flex upon increases in pressure acting on the upstream face of said flow control member.

The outer wall 21 of the flow control member 15 is provided with a plurality of by-pass passageways 23, 23, shown as notches of a generally semi-circular form opening to the periphery of said flow control member, for passing fluid at low pressures around the side of said flow control member. It should be understood that while the by-pass passageways 23 are herein shown as being generally semi-circular, that they need not be so shaped but may be of any form desired.

The downstream face of the flow control member 15 is shown as being contoured or recessed inwardly of the wall thereof, to form a plurality of segmental ribs 24, 24 extending along the periphery thereof to the by-pass passageways 23, 23, the outer margins of which ribs are formed by the inwardly tapered outer wall portion, 22. The ribs 24, 24 serve to space the contoured portion of the downstream face of the flow control member 15 in spaced relation with respect to the shoulder 14, to accommodate the free passage of fluid through the by-pass passageways 23, 23 into the outlet passageway 12, upon low pressure conditions in the inlet passageway 11.

Within the ribs 24, 24 on the downstream face of the flow control member 15 is a generally annular downwardly opening passageway 25, terminating at its inner margins into segmental projections or ribs 26, 26 and into outer depending lips 27, 27 of a recessed or concave face 29. The recessed or concave face 29 is shown as being in the general form of the frustum of a cone terminating at its inner margins in an annular shouldered recess 30 at the downstream side of the orifice 19.

The segmental ribs 26, 26 and lips 27, 27 are spaced downwardly from the bottom portion of the flow control member defining the top of the channel 25 and form control edges and a valve means engageable with the shoulder 14 upon increases in pressure on the upstream surface and sides of the flow control member 15.

It may be seen from the foregoing that as the pressure of the fluid acting on the upstream face 17 and sides of the flow control member 15 increases, said flow control member flexes in the direction of the flow of fluid through the orifice 19 toward the shouldered seat 14, first bringing the segmental ribs 26, 26 into engagement with the shoulder and then bringing the lips 27, 27 into engagement with said shoulder, and restricting the cross-sectional area of the orifice 19 by flexure of the body of the flow control member into engagement with the shoulder 19 and outwardly therealong.

It may further be seen that as the segmental ribs 26, 26 first engage the shoulder 14, the flow of fluid through the by-pass passageways will be restricted to the space between the lips 27, 27 and the shoulder 14, resulting in a substantial reduction in the flow of fluid through the by-pass passageways as well as through the central orifice 19, and that as the pressure of fluid on the upstream face 17 of the flow control member 15 increases further, the lips 27, 27 will then come into engagement with the shoulder or seat 14, seating against said shoulder and blocking the flow of fluid through the by-pass passageways and then controlling the flow solely by flexing of the body of the flow control member inwardly along the shoulder 14.

It will be observed from this figure that in all positions of deformation of the flow control member 15, like the flow control member shown in my companion application Serial No. 389,210 previously mentioned, that the orifice 19 is spaced from the inlet side of the reduced diameter outlet passageway 12, and that the flow control member is never deformed into said outlet passageway. The flow control member rather reacts against the shoulder 14 and spreads outwardly therealong in its periphery and inwardly therealong along the recessed portion thereof, and at the same time flexes along its central portion to reduce the cross-sectional area at the orifice 19 upon increases in pressure. The flow control member positively blocks the flow of fluid through the by-pass passageways 23, 23 above certain predetermined pressures and then controls the flow solely by reduction in cross-sectional area of the central orifice 19 as the pressure in the upstream face of said control member increases, so as to provide a uniform flow throughout the entire pressure range, with a reduced threshhold pressure and a resultant free flow of fluid under low pressure conditions.

It will be understood that modifications and variations may be effected in the present invention without departing from the scope of the novel concepts thereof.

I claim as my invention:

1. A flow control device for maintaining a substantially uniform fluid delivery rate over a wide range of pressure variations comprising a casing having a passageway leading therethrough, a shoulder in said passageway facing the upstream side thereof, a resilient annular flow control member in said passageway, the inner margins of which define a flow orifice, a by-pass passageway in said flow control member, leading therethrough and opening to the periphery thereof and accommodating the flow of fluid along the side of said flow control member under low pressure conditions, said flow control member also having a downstream face spaced from said shoulder inwardly of the periphery thereof, and flexing downwardly into engagement with said shoulder radially inwardly of said by-pass passageway and moving radially inwardly along said shoulder upon increase in pressure on the upstream face thereof, and having sealing engagement with said shoulder to block the flow of fluid through said by-pass passageway upon increases in pressure on the upstream face thereof.

2. A fluid control device for maintaining a substantially uniform fluid delivery rate over a wide range of pressure variations comprising a casing having a passageway leading therethrough, a shoulder in said passageway facing the upstream side thereof, a resilient annular flow control member in said passageway seating against said shoulder, the open portion of which forms a flow orifice, said flow control member having a concave face portion on the downstream side thereof with a recess defining the outer margins of said concave face portion and forming a fluid passageway channel, a central orifice communicating with said concave face portion, and a by-pass passageway opening to the periphery thereof and extending axially therealong, for by-passing fluid at low pressure through said channel fluid passages, and said flow control member engaging said shoulder inwardly of said channel upon increases in pressure on the upstream face thereof, and having sealing engagement with said shoulder to block the flow of fluid through said by-pass passageway at predetermined high pressure ranges.

3. In a fluid flow control device for maintaining a substantially uniform fluid delivery rate over a wide range of pressure variations comprising a casing having a passageway leading therethrough, a shoulder in said passageway facing the upstream side thereof, a resilient annular flow control member in said passageway, the inner margins of which define a flow orifice, said flow control member having a recessed face on the downstream side thereof and having spaced ribs extending along the outer margin thereof and spacing said face from said shoulder and accommodating said recessed face to flex downwardly into engagement with said shoulder upon increases in pressure to restrict the cross-sectional area of said central orifice without deforming said flow control member beyond the face of said shoulder, and means affording flow resistance to said flow orifice for low pressure conditions comprising a plurality of by-pass passageways leading through said flow control member and opening to the periphery thereof into said shoulder through said ribs, for accommodating the by-pass of fluid around the periphery of said flow control member at low pressure conditions, and said flow control member flexing into engagement with said shoulder and sealing thereagainst to block the passage of fluid through said by-pass passageways upon predetermined increases in pressure.

4. In a fluid flow control device for maintaining a substantially uniform delivery rate over a wide range of pressure variations comprising a casing having a passageway leading therethrough, a shoulder in said passageway facing the upstream side thereof, a resilient annular flow control member in said passageway seating against said shoulder, the inner margins of said flow control member defining a central fluid flow orifice, said flow control member having a recessed face facing said shoulder and spaced from said shoulder and having a generally frusto-conical recess extending inwardly within the body of said flow control member into said central flow orifice, and a downwardly opening channel spaced outwardly from said frusto-conical recess, the outer margins of said frusto-conical recess projecting from the downstream face of said flow control member defined by said channel and flexing into sealing engagement with said shoulder upon increases in pressure thereon, to block the passage of fluid past the sides of said flow control member upon predetermined high pressure conditions, and means affording flow assistance to said central fluid flow orifice comprising a plurality of by-pass passageways extending axially along the margin of said annular flow control member into said channel for the free flow of fluid along the sides of said flow control member through said passageway at low pressure conditions.

5. In a fluid control device for maintaining a substantially uniform delivery rate over a wide range of pressure variations comprising a casing having a passageway leading therethrough, a shoulder in said passageway facing the upstream side thereof, a resilient annular flow control member in said passageway seating against said shoulder, the inner margins of said flow control member defining a central fluid flow orifice, by-pass passageways extending along a periphery of said flow control member and opening to the interior thereof, said flow control member having a recessed portion on the downstream face thereof, in the general form of an annular channel facing said shoulder and having spaced ribs extending from the inner margins of said channel in a downstream direction with a generally frusto-conical recess extending inwardly from said ribs having outer lip portions in the spaces between said ribs and terminating radially inwardly from said ribs and extending in a downstream direction from the portion of said flow control member forming the base of said channel, a lesser distance than said ribs, said channel accommodating the by-pass of fluid through said by-pass passageways at low pressure conditions, said ribs flexing into engagement with said shoulder to restrict the passage of fluid through said by-pass passageways upon increases in pressure, and said lips positively blocking the flow of fluid through said by-pass passageways upon certain other predetermined increases in pressure and accommodating the control of the flow of fluid solely by restricting the cross-sectional area of said orifice by flexing said flow control member into engagement with and outwardly along said shoulder.

6. In a flow control device for maintaining a substantially uniform delivery rate over a wide range of pressure variations comprising a casing having a passageway leading therethrough, a shoulder in said passageway facing the upstream side thereof, a resilient flow control member in said passageway seating against said shoulder, at least one axial passageway extending along the outer wall of said flow control member and opening to the periphery thereof, said flow control member having a recessed central portion spaced from said shoulder and having communication with said axial passageway, and flow control lip portions depending from said recessed central portion, and moving toward said shoulder upon increase in pressure on said flow control member to restrict the passage of fluid through said axial passageway.

7. In a flow control device for maintaining a substantially uniform delivery rate over a wide range of pressure variations comprising a casing having a passageway leading therethrough, a shoulder in said passageway facing the upstream side thereof, a resilient flow control member in said passageway seating against said shoulder, at least one axial passageway extending along the outer wall of said flow control member and opening to the periphery thereof, said flow control member having a recessed central portion spaced from said shoulder and having communication with said axial passageway, and having spaced ribs spaced inwardly from the outer edge of said flow control member and facing in a down stream direction, and lip portions in the spaces between said ribs and extending toward said seat a lesser distance than said ribs, said ribs flexing into engagement with said shoulder to restrict the passage of fluid through said axial passageway and said lip portions further restricting the flow of fluid through said axial passageway upon certain other increases in pressure.

References Cited in the file of this patent

UNITED STATES PATENTS

| | | |
|---|---|---|
| 2,460,647 | Miller | Feb. 1, 1949 |
| 2,564,286 | Stephany | Aug. 14, 1951 |
| 2,572,244 | Chace | Oct. 23, 1951 |
| 2,632,476 | Miller | Mar. 24, 1953 |
| 2,642,896 | Cantalupo et al. | June 23, 1953 |
| 2,667,900 | Cantalupo | Feb. 2, 1954 |